J. FOWLER.
Globe-Valve.
No. 222,887.  Patented Dec. 23, 1879.
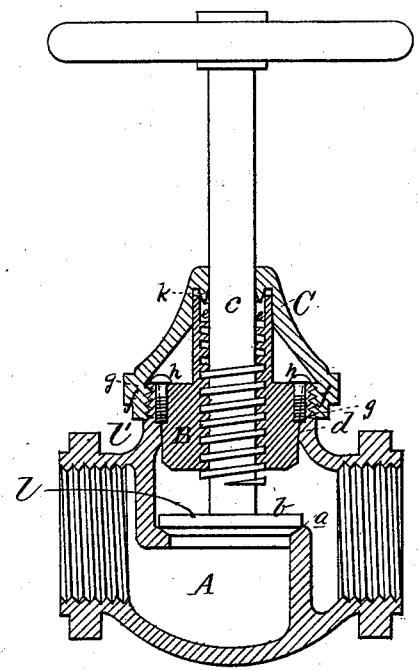
WITNESSES
INVENTOR
John Fowler
by E.W. Anderson
his ATTORNEY

UNITED STATES PATENT OFFICE

JOHN FOWLER, OF LOUISVILLE, KENTUCKY.

IMPROVEMENT IN GLOBE-VALVES.

Specification forming part of Letters Patent No. 222,887, dated December 23, 1879; application filed November 18, 1879.

*To all whom it may concern:*

Be it known that I, JOHN FOWLER, of Louisville, in the county of Jefferson and State of Kentucky, have invented a new and valuable Improvement in Globe-Valves and other Cocks; and I do hereby declare that the following is a full, clear, and exact description of the construction and operation of the same, reference being had to the annexed drawing, making a part of this specification, and to the letters and figures of reference marked thereon.

The figure of the drawing is a representation of a vertical central section of a globe-valve embodying my invention.

This invention has relation to globe-valves and other cocks; and it consists mainly in the construction and novel arrangement of a loose nut turned with a taper on the outside to fit a tapered way in the body, and having a packing-recess in its upper end, and an exterior screw-cap having an internal cylindrical pressure-flange engaging the recess in the nut around the valve-stem, all as hereinafter shown and described.

In the accompanying drawing, the letter A designates the body or valve-case, having the valve-seat $a$, with which the valve $b$ engages. The valve is provided with a threaded stem, $c$, and is of such size that it can be readily removed through the opening $d$ in the body above the valve-seat, when necessary for regrinding or other purposes. This opening or way $d$ is somewhat tapered inward and downward toward the valve-seat, and receives the nut B, which is correspondingly tapered on its lower portion, while its upper end is recessed at $e$ to form an annular chamber around the valve-stem $c$, which passes through the nut, as shown in the drawings.

C represents the exterior covering or cap of the valve-case, which is provided with a threaded flange, $f$, to engage with the exterior thread, $g$, around the opening at the top of said case. The valve-stem passes out through this cap, which is provided with an internal annular flange, $k$, extending down around the valve-stem and into the packing-recess of the nut B, exerting a pressure on the packing therein, so as to keep it in close contact with said stem. Small screws $h$, or other fastenings, are employed to hold the nut B to its tapered seat in the body, so that when the cap C is screwed off the nut will remain in place, and the packing can be arranged around the stem while there is a pressure in the valve chamber or body.

In opening the valve its upper face, $l$, can be brought against the lower face, $l'$, of the nut, to close the threaded way and make all tight for the removal of the cap under pressure, for renewing the packing.

The valve can be reground on its seat, without removing it from the valve-body, when the small fastening-screws $h$ are removed, as the nut C will then turn in its seat or way when the valve-stem is revolved. The nut thus forms a guide for the stem, and the valve will be ground true. The nut C, when worn out, can be readily replaced at but little expense.

Having described this invention, what I claim and desire to secure by Letters Patent, is—

1. In a globe valve or cock having the tapered way $d$ and the threaded valve-stem $c$, the tapered interior nut, B, having a packing-recess, $e$, around the stem in its upper end, and the screw-cap C, having an internal annular pressure-flange, $k$, around said stem, extending into said packing-recess, substantially as specified.

2. The globe valve or cock having the threaded valve-stem $c$, recessed nut B, fastening-screws $h$, and flanged pressure-cap C, screwed to the neck of the body and engaging the packing-recess of said nut, as specified.

In testimony that I claim the above I have hereunto subscribed my name in the presence of two witnesses.

JOHN FOWLER.

Witnesses:
 WM. W. DRUMMOND,
 WM. T. DRUMMOND.